(12) United States Patent
Homer et al.

(10) Patent No.: US 7,141,780 B2
(45) Date of Patent: Nov. 28, 2006

(54) POSITION DETERMINATION SYSTEM FOR DETERMINING THE POSITION OF ONE RELATIVELY MOVEABLE PART RELATIVE TO ANOTHER RELATIVELY MOVABLE PART

(75) Inventors: Michael Homer, Dursley (GB); Alan James Holloway, Wotton-under-Edge (GB); Iain Robert Gordon-Ingram, Marshfield (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 10/258,143

(22) PCT Filed: Feb. 14, 2002

(86) PCT No.: PCT/GB02/00638

§ 371 (c)(1),
(2), (4) Date: Oct. 21, 2002

(87) PCT Pub. No.: WO02/065061

PCT Pub. Date: Aug. 22, 2002

(65) Prior Publication Data

US 2004/0036016 A1    Feb. 26, 2004

(30) Foreign Application Priority Data

Feb. 14, 2001    (GB) ................ 0103582.3

(51) Int. Cl.
*G01D 5/34* (2006.01)
(52) U.S. Cl. ................................. 250/231.13
(58) Field of Classification Search ................
250/231.13–231.19, 237 G, 237 R; 356/614–622;
341/13, 14
See application file for complete search history.

(56) References Cited

U.S. PATENT DOCUMENTS

| | | | | |
|---|---|---|---|---|
| 4,631,404 A | | 12/1986 | Burkhardt et al. | 250/237 G |
| 4,912,322 A | * | 3/1990 | Ichikawa | 250/237 G |
| 4,959,542 A | | 9/1990 | Stephens | 250/237 G |
| 5,073,710 A | * | 12/1991 | Takagi et al. | 250/231.14 |
| 5,302,820 A | | 4/1994 | Henshaw et al. | 250/231.16 |
| 6,031,224 A | * | 2/2000 | Peterlechner | 250/231.13 |
| 6,097,490 A | | 8/2000 | Holzapfel et al. | 356/614 |
| 6,342,697 B1 | * | 1/2002 | Nagai et al. | 250/231.13 |
| 6,472,658 B1 | * | 10/2002 | Mayer et al. | 250/237 G |
| 6,486,467 B1 | * | 11/2002 | Speckbacher et al. | 250/237 G |

FOREIGN PATENT DOCUMENTS

| | | |
|---|---|---|
| DE | 197 54 595 A1 | 6/1999 |
| EP | 0 207 121 B1 | 1/1987 |
| EP | 0 209 676 A2 | 1/1987 |
| EP | 0 887 625 A2 | 12/1998 |
| EP | 1 010 967 A2 | 6/2000 |
| GB | 1 302 762 | 1/1973 |
| GB | 1 303 273 | 1/1973 |

* cited by examiner

*Primary Examiner*—Thanh X. Luu
(74) *Attorney, Agent, or Firm*—Oliff & Berridge, PLC

(57) ABSTRACT

A measurement scale (20) is movable in plane x relative to a mask (10) and photodetector (30). When a pattern of apertures in the mask (10) are in correlation with a pattern of apertures e.g. a reference mark in the scale (20) then light bands a b and c may propagate to the detector (30). The relative sizes of the patterns is such that the light bands converge at the detector (30). Other embodiments show light divergent and light inversion correlation of incongruent patterns.

15 Claims, 5 Drawing Sheets

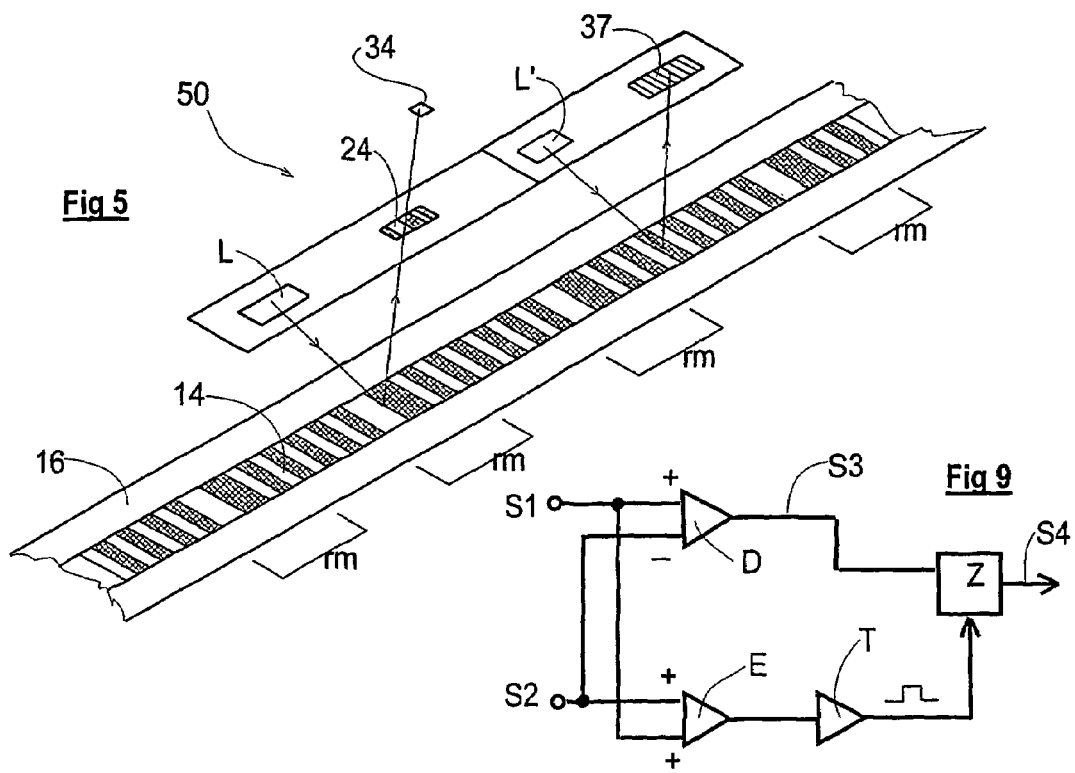
Fig 5
Fig 9
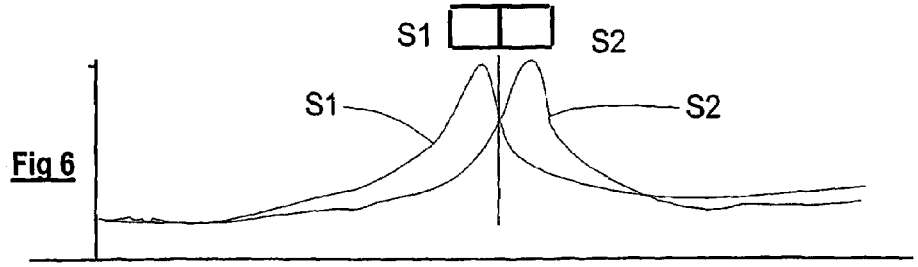
Fig 6
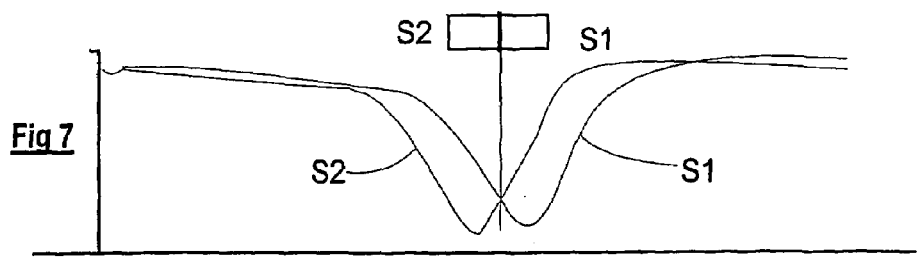
Fig 7
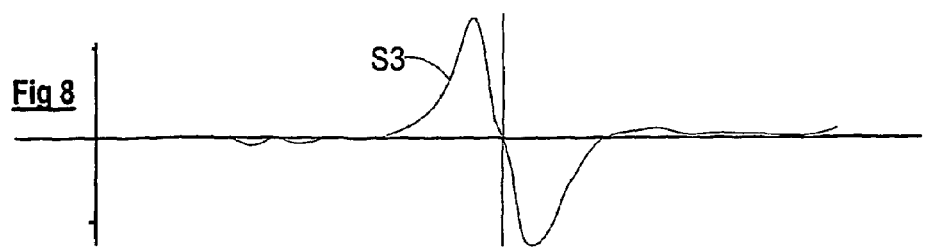
Fig 8

POSITION DETERMINATION SYSTEM FOR DETERMINING THE POSITION OF ONE RELATIVELY MOVEABLE PART RELATIVE TO ANOTHER RELATIVELY MOVABLE PART

This invention relates to the determination of the position between two relatively movable parts by reading a reference mark. The invention relates particularly to the apparatus for reading such a reference mark.

Well known in the art of measurement are measurement scales having periodic markings thereon, which can be read by a so-called readhead. Commonly the measurement scale has incremental markings and a periodic signal is generated from the readhead when relative movement between the measurement scale and readhead takes place. These signals are counted and the displacement between the scale and the readhead can be determined.

Known also are measurement scales with reference marks i.e. marks which provide a positional "reference" point on the measurement scale for the readhead at possibly regular intervals, but not necessarily with such a fine period as those markings of an incremental measurement scale. The reference markings may allow for the verification of the accuracy of the incremental count, and may be used to identify a position in the cycle of a rotatable measurement scale.

Reference marks are useful for determining the position of the readhead relative to the measurement scale, for example when an incremental count has been lost or is inaccurately made due to factors like too fast a travel of the readhead, or dirt on the measurement scale.

Typically an incremental scale is provided for example in the form of a track having a series of periodic markings, and reference marks are provided on a separate track on the measurement scale also. Linear and rotary scales of the type mentioned above are shown in U.S. Pat. No. 4,631,404.

Conventionally a reference mark is formed from a pseudo-random set of marks and is read by a readhead having a light detector and a mask which contains holes of exactly the same random pattern. When the readhead reaches a reference mark on the measurement scale a signal is produced as a result of the increased light level produced when the scale mark and the mask align. An illustration of such a reference mark is shown in United Kingdom Patent No. 1,302,762.

The technique of correlating a reference mark and a mask requires a photodetector to provide a signal peak when exact correlation is obtained. A disadvantage of this system is that dirt on the measurement scale or mask and misalignment can drastically reduce the amplitude of the signal. Any reduction in the amplitude of the signal results in an inaccurate determination of the reference mark position. Collimated light is desirable to give a good signal when a reference mark and mask of the same size align or correlate.

According to the present invention there is provided a position determination device comprising a light detector, a source of light and, first and second relatively movable elements in use co-operable to produce a change in light intensity at the detector, the first element having a first pattern and the second element having a second for interacting with the first pattern and light, one of the patterns representing a reference position, characterised in that one of the patterns is an incongruent version of the other, and in that the light from the source is uncollimated.

In this description incongruence has the topological meaning whereby if one shape is placed on top of another and it does not match then the two shapes are said to be incongruent.

In a first set of embodiments the said one incongruent version of the pattern is a reduced scale version of the other.

In one embodiment of the first set of embodiments the first element is a mask and the second element is a measurement scale. In this embodiment the mask and detector may be in fixed spaced relation and light may propagate from the light source through the pattern onto the mask, onto the measurement scale and from there onto the detector.

In another embodiment of the first set of embodiments the first element is a measurement scale and the second is a grating. In this embodiment the grating and detector may be in fixed space relation and light may propagate from the light source onto the measurement scale, through the pattern on the grating and onto the detector.

In each embodiment mentioned above the reduced scale of the second pattern in relation to the first pattern may be given by the resultant of the equation $v \div (u+v)$ where v is the distance between the second pattern and the detector and u is the distance between the first pattern and the second pattern. Using such a reduced scale version of one of the patterns provides for the light falling on the detector to converge there at when the first and second patterns align. The effect is referred to in this application as convergent correlation.

In a second set of embodiments the said one incongruent version of the pattern is an increased scale version of the other.

In one embodiment of the second set of embodiments the first element is a measurement scale, and the second element and the detector are combined such that the second pattern is formed on the detector.

In this embodiment the scale of the second pattern in relation to the first pattern may be given by the resultant of the equation $(u+v) \div v$ where v is the distance between the first pattern and the light source and u is the distance between the first pattern and the second pattern.

Using such an increase in scale for one of the patterns provides for divergent light from the source (e.g. a point source) to fall on the detector when the two patterns align. Using such an increased scale version of one of the patterns is referred to in this application as divergent correlation.

In a third set of embodiments the said one incongruent version of the pattern is an inverted version of the other.

In one embodiment of the third set of embodiments the first pattern is the same size as the second pattern (but inverted). In another embodiment the patterns are different sizes. Preferably for either embodiment the inversion takes place during propagation of the light from the source through a pinhole.

Preferably for either embodiment the first element is a measurement scale and the second element and the detector are combined such that the second pattern is formed on the detector.

In either of the embodiments of the third set the scale of the second pattern in relation to the first pattern may be given by a resultant of the equation $u \div v$ where v is the distance between the pinhole and the second pattern and u is the distance between the pinhole and the first pattern.

Using such an inverted version of one of the patterns is referred to in this application as pinhole correlation.

Incremental displacement determination devices are known. In particular European Patent No. 207121 shows an arrangement whereby periodic markings on the measurement scale are used to produce a signal during displacement during movement of a readhead along the measurement scale. This document illustrates the construction of a readhead which is tolerant to such deficiencies as measurement scale pitch error, dirt on the measurement scale and (importantly in this instance) missing periodic markings. Thus the incorporation of a reference mark pattern into the periodic markings on the measurement scale of the displacement determination device shown in European Patent No. 207121 is feasible with this invention. Side-by-side incremental scales and reference marks have been considered for example in United Kingdom Patent No. 1,303,273. Also absolute positional data i.e. coded positional data, has been incorporated into a multi-track scale e.g. European Patent No. 1010967.

However, use of marks incorporated into the periodic incremental pattern of a scale is not known and so preferably the pattern is formed from a code of missing and/or additional bits of a periodic series of bits.

Thereby, when the first and second codes are in correct alignment, a predetermined amount of light will fall on the detector and thereby cause a signal to be produced.

Preferably the missing and present bits of the series form a pseudo-random code (e.g. a Barker code).

Advantageously in the above-mentioned first set of embodiments the convergence at the detector allows for the detection of code alignment at the detector without significant error in the amount of light expected at the detector even when some of the code is corrupted. Also positional accuracy of these embodiments will be tolerant to dirt and misalignment of the patterns.

Embodiments of the invention will now be described with reference to the drawings which show, at:

FIG. 1 a diagrammatic representation of convergent correlation;

FIG. 5 shows in more detail the embodiment illustrated in FIG. 4;

FIG. 6 is a graph showing the output of light detectors of the embodiment in FIG. 4;

FIG. 7 is a graph showing the output of light detectors of the embodiment in FIG. 2;

FIG. 8 is a graph showing the output of the difference between the output of the light detectors in both the above embodiments;

FIG. 9 is a circuit for obtaining a signal from the outputs of the light detectors of either the embodiments above;

Figure 1:
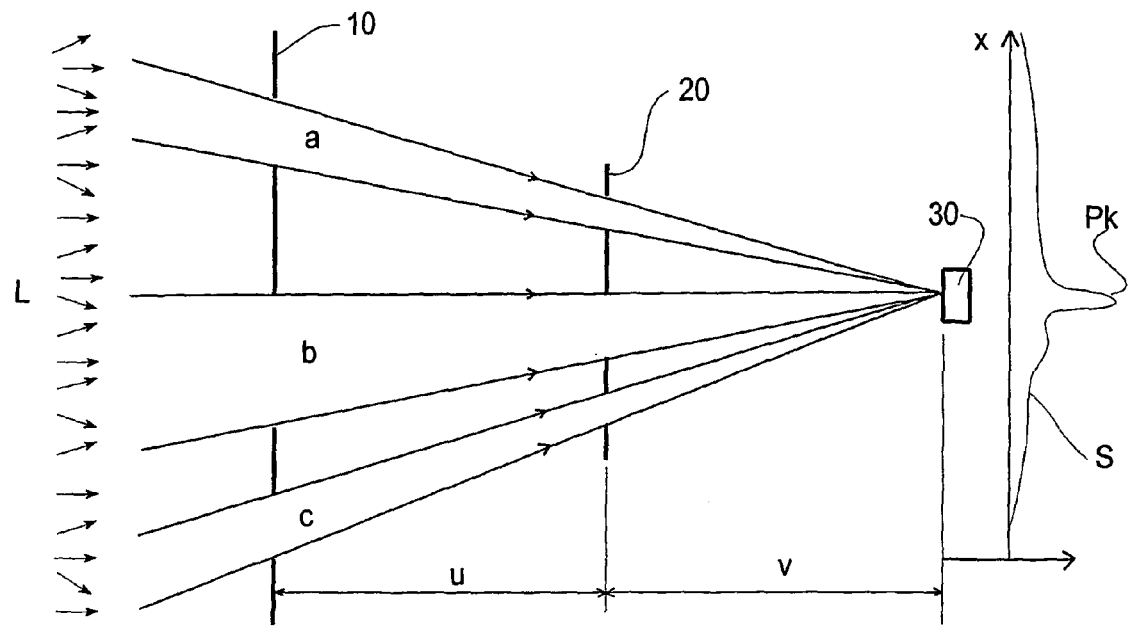

FIG. 1 illustrates a principle of the invention and shows two masks 10 and 20. Each mask has a pattern for allowing light to pass. In practice, patterns 10 and 20 will be attached to some relatively movable objects. A diffuse uncollimated light source L is provided but the light could be diffuse ambient light, or could be focussed (possibly ambient) light. The light referred to throughout this specification is intended to embrace visible or non-visible parts of the electromagnetic spectrum. Shown also in FIG. 1 is a light detector 30 which in practice is fixed in relation to one of the masks 10 or 20. The distances u and v between the elements 10, 20 and 30 must be maintained.

The patterns of the masks 10 and 20 may be pseudo-random, and may be Barker codes.

The patterns of the masks 10 and 20 are the same but pattern 20 is a scaled version of pattern 10. The amount of scaling is given by the equation v÷(u+v) where u is the distance light has to propagate between pattern 10 and 20 and v is the distance light has to propagate between pattern 20 and the light detector.

The masks have light transmissive areas for example holes and opaque areas. In FIG. 1 the areas are slots and extend into the page. The scaling of pattern 20 dictates that bands of light (bands a, b and c in this instance) will converge at the detector 30. Thus as either of the patterns 10 or 20 moves in the direction of x the signal S from the detector suddenly changes at correlation of the two patterns, producing a signal peak $P_K$.

Figure 3:
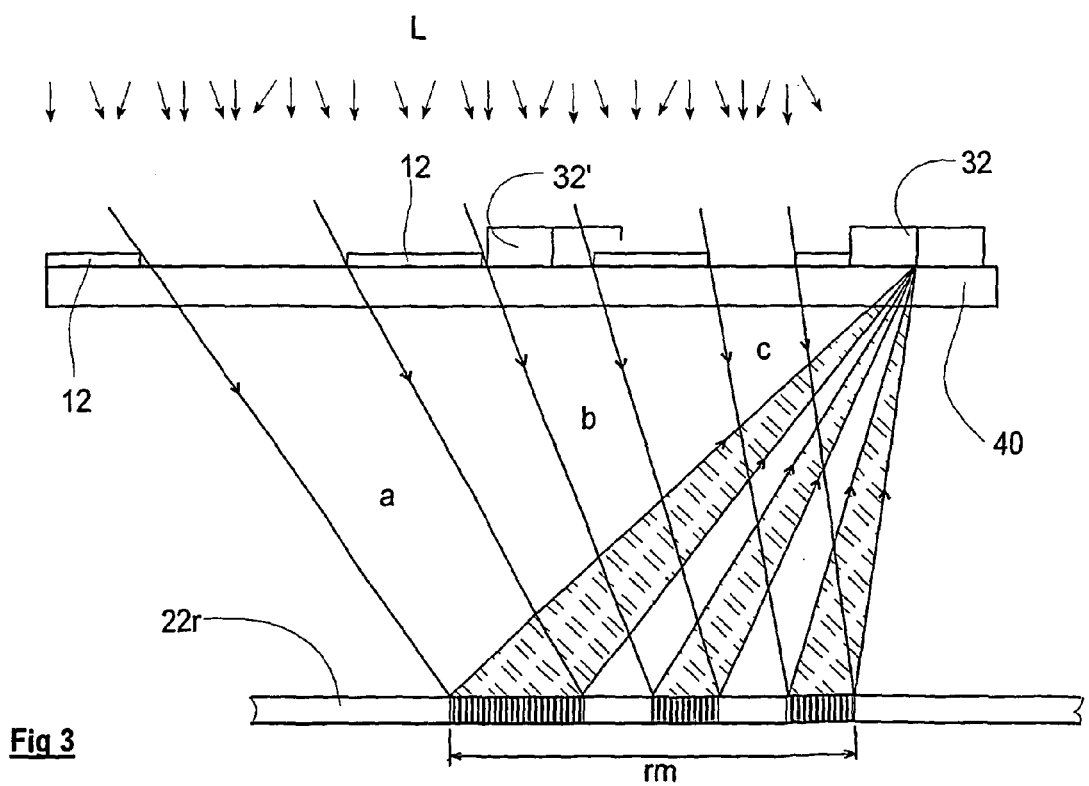
FIG. 3 shows detail of the first embodiment illustrated in FIG. 2.
Figure 2:
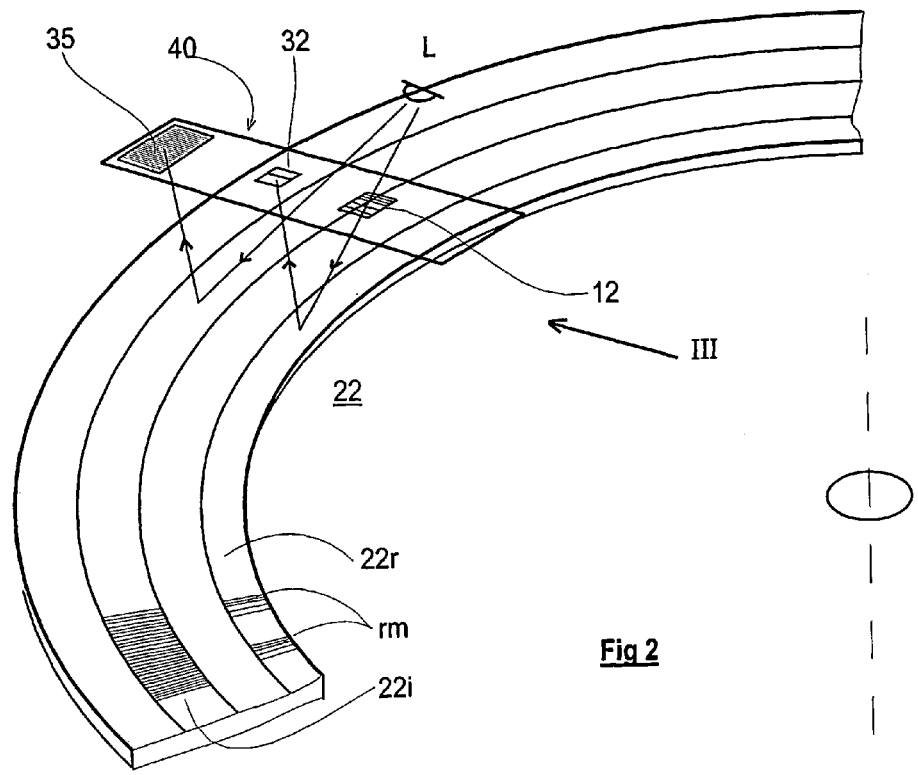
FIG. 2 shows a position determination device according to an embodiment of the invention utilising convergent correlation.

Referring now to FIGS. 2 and 3, a rotary encoder is shown utilising the above-mentioned principle. The arrangement of the parts of the encoder is shown in FIG. 2. In this embodiment the angular position of rotatable plate 22 is determined by its interrogation by a readhead element 40. The plate has two readable tracks 22i and 22r. Track 22i is a continuous series of evenly spaced, radially extending marks (a portion of which are illustrated) which interact with light from a source L. A series of spaced photodetectors known as an electrograting 35 receives light reflected from the track 22i. Track 22i and electrograting 35 form an incremental angular measurement system for producing signals representing their relative displacement. This is known as an incremental count, such a system is disclosed in U.S. Pat. No. 5,302,820. Now to determine the actual position of the plate relative to the readhead (rather than the amount of rotational displacement that has taken place) then a reference mark or marks is or are provided on a second track 22r.

Light from the source L propagates through the mask 12 and onto the track 22r, from where it is reflected to detector 32. The paths of light are shown in FIG. 3 (paths a, b and c in the instance).

In this embodiment an arrangement different to that described for FIG. 1 is shown. In the present embodiment the reference mark rm is formed on a reflective surface, but does not itself reflect light to the detector. The mark is made from a grating of an embossed diffractive micro-structure in pseudo-random zones. The reference mark rm is a scaled version of the mask 12, so when correlation occurs a shadow will be cast on the detector, causing a sudden change (a dip in fact) in the intensity of light at the detector. This dip can be detected in the same way as a peak can be detected and is discussed in detail later in this description.

FIG. 3 shows sections through mask 12 and plate track 22.

FIG. 3 is a view in the direction of arrow III in FIG. 2 and it will be noted that, for clarity, it is not drawn accurately. Detector 32 should in fact be in the position shown by the chain-dotted outline at 32', but is shown to one side so that the paths of light can be more clearly seen. If drawn accurately the paths a,b and c would extend into the paper.

So, in use, plate 22 rotates and the stationary readhead 40 can detect incremental displacement and one or more reference positions.

The electrograting 35, detector 32 and mask 12 may conveniently be mounted to the same surface for example a piece of glass or a custom integrated circuit device. The plate 22 may have a reflective surface except where marks are made. The marks could be a number of embossed lines of 5 micron pitch which form a phase grating and act to scatter light falling thereon so as to appear to the detector as non-reflective areas. These lines can be made by conventional compact disc manufacturing technology.

Figure 4:
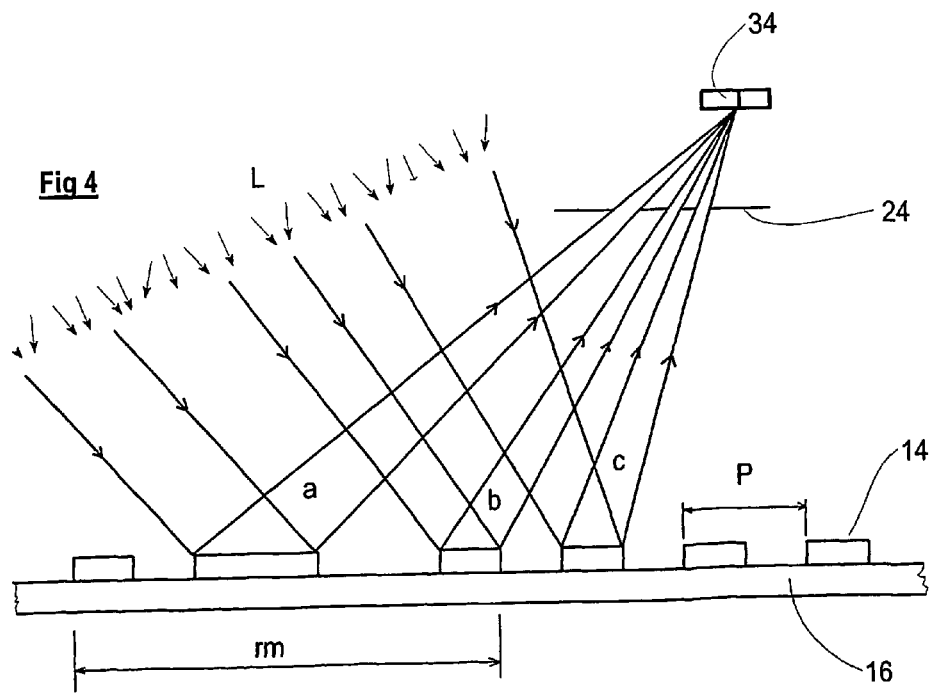
FIG. 4 shows a further position determination device according to another embodiment of the invention utilising convergent correlation.

FIGS. 4 and 5 show another embodiment of the invention using convergent correlation. These figures illustrate a linear encoder. In this embodiment a linear incremental scale 14 is carried by a substrate 16. The scale 14 has embedded within its periodic markings P a reference mark rm, in this case formed by adding and removing parts of the incremental scale. In this embodiment the scale is made from reflective elements on a non-reflective substrate, for example chrome on glass. The linear scale 14 and reference marks rm are read by a readhead 50. Light L falling on the scale 14 is reflected by the reflective surfaces of the scale 14. When a reference mark rm is aligned with the mask 24 then light in paths a,b and c will fall directly onto the detector 34. A peak in the output from detector 34 will occur when the alignment is as illustrated in FIG. 4. The signal processing of this peak is discussed later.

The mask 24 is again a scaled version of the reference mark pattern rm.

Shown also in FIG. 5 as part of the readhead 50 is an incremental scale reader having a second light source L' and an electrograting 37. Light L' reflected from the periodic scale is formed into interference fringes at the electrograting. The fringes can be counted electronically to provide an indication of displacement. In this embodiment the scale and electrograting are of the type described in e.g. our previous patent European Patent No. 207121. In practice such arrangements provide an incremental count which is largely immune to the added or removed bits of the scale at the reference marks.

The processing of the signals produced by the detectors 30,32 and 34 will now be described. FIG. 1 shows the output from the detector 30 as the convergent paths of light a,b and c cross it during the travel of one of the masks 10 or 20 in the direction of x. There is a peak P which could be measured.

Alternatively a split detector 32,34 could be used, known as a bi-cell. In this instance two peaks (or dips) will be detected. The output, then, from the bi-cell 32 in FIGS. 2 and 3 will be as illustrated in FIG. 7, whereas the output from bi-cell 34 in FIGS. 4 and 5 will be as illustrated in FIG. 6.

In each case the signals can be processed using the circuit shown in FIG. 9. Signals S1 and S2 from each side of the bi-cell are subtracted (S1−S2) at component differential amplifier D and summed at summing junction E (S1+S2). The signal S3 resulting from the subtraction S1−S2 is shown in FIG. 8, having a zero crossing point at the junction of the bi-cell. This zero crossing point is the point of interest and can be detected by a zero crossing detector z. The zero crossing detector in use is enabled by a threshold monitor T which is activated when S1+S2 reaches a predetermined threshold. Trigger output S4 is produced when a zero crossing is made when the zero crossing detector is activated.

When a reference mark is not in alignment there will be background noise which will not take the summed signal S1+S2 past the threshold value and therefore no trigger signal S4 will be obtained.

The same circuit is used for the signals S1 and S2 of the bi-cell 32 and bi-cell 34.

Many variants and modifications of the foregoing description and the drawings will be apparent to the skilled addressee. For example the first embodiment (the rotary encoder) may employ a single incremental track having reference marks embedded therein. The second embodiment (the linear encoder) may employ a separate track for the reference marks.

In either embodiment a single reference mark may be used for example to provide a datum, or more than one mark may be used for example a mark every 10 mm.

The words "mark" and "pattern" used throughout the above description are intended to encompass any matter which is distinguished from its immediate surroundings.

The convergent correlation principle will work either with a light increase i.e. correlation of light transmissive parts, or with a light decrease i.e. correlation of light non-transmissive parts. A mark or pattern of light transmissive parts may be formed as e.g. a reflective area or an aperture. A mark or pattern of light non-transmissive parts may be formed e.g. as a reflective/opaque area (possibly in an otherwise light transmissive part), or a diffraction region (which scatters light). The particular combinations which might be employed are: chrome or aluminium on a transparent substrate such as glass or plastic, in which case the mark may be a reflective part of a non-reflective part; or a diffractive area surrounded by a reflective surface.

Figure 10:
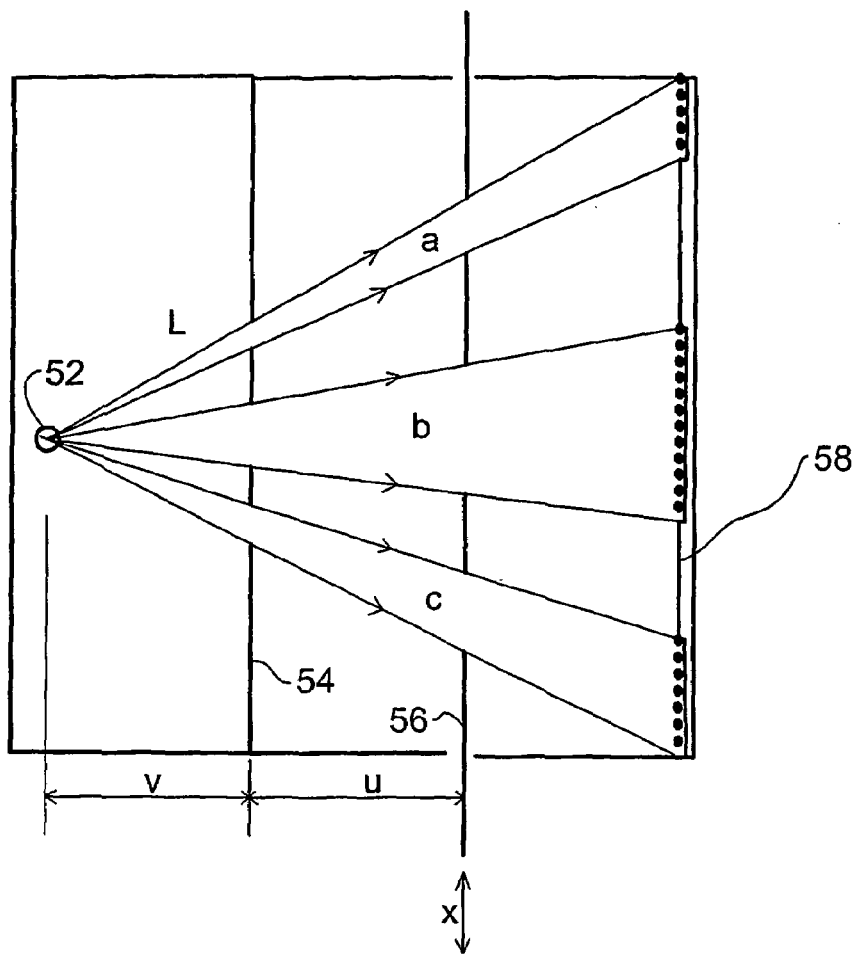
FIGS. 10 and 11 show two embodiments utilising divergent correlation.

FIG. 10 shows a similar measurement device to those described above. Divergent light L from a point source 52 passes through a mask 54 having a first pattern of apertures therein. The light is allowed to propagate only through those apertures along paths a,b and c. A second pattern of apertures, similar to the first, but on an enlarged scale is formed in another mask 56. In this instance mask 56 is movable in the x directions and the two patterns are alignable such that, at correlation, light L may fall on the photodetector array 58 along paths a,b and c to cause a signal peak from that detector 58.

The scale of the first pattern in relation to the second pattern is given by the resultant of the equation (u+v)÷v where v is the distance between the first pattern and the light source and u is the distance between the first and second patterns. Mask 54 may be omitted but the signal peak will not be so distinct. Mask 56 may be a measurement scale having a reference mark thereon. Detector 58 is an array of photodetectors forming a pattern which matches the form of the first and second patterns. The light source 52, mask 54 and detector 58 are all held in fixed space relation.

Figure 11:
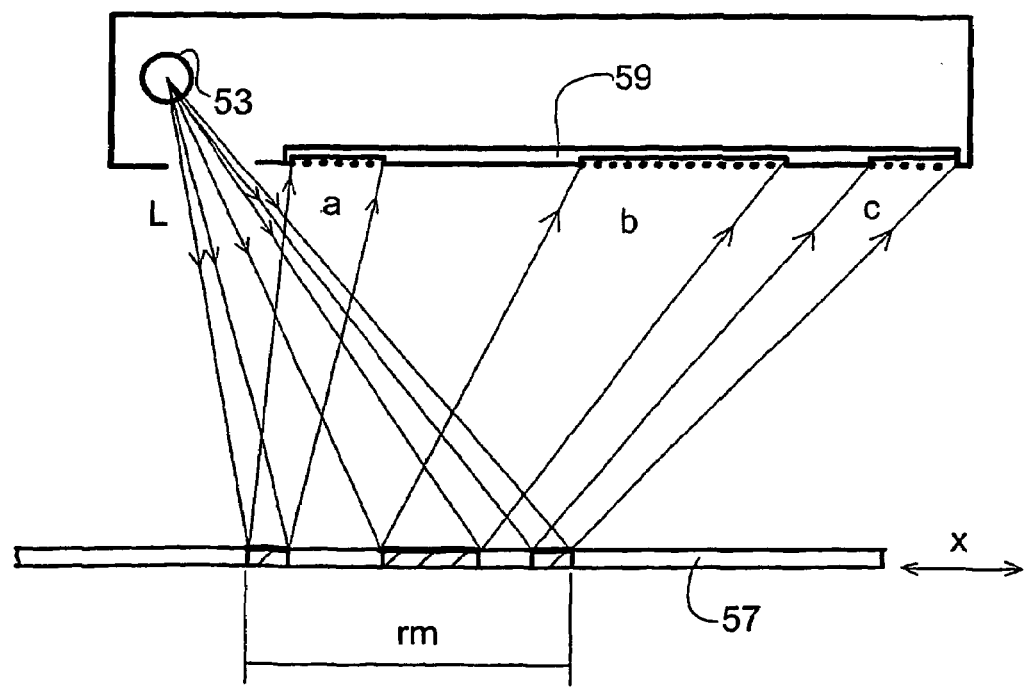

FIG. 11 shows another embodiment utilising divergent correlation. Light L from source 53 is reflected by a measurement scale 57 incorporating a reference mark rm (the first pattern). The light is reflected only along bands a,b and c by the mark rm. Detector array 59 has formed thereat a pattern complementing the reference mark rm (the second pattern).

When the mark and detector correlate then the light bands a,b and c fall directly onto the corresponding pattern on the detector and a signal peak will be generated.

Figure 12:
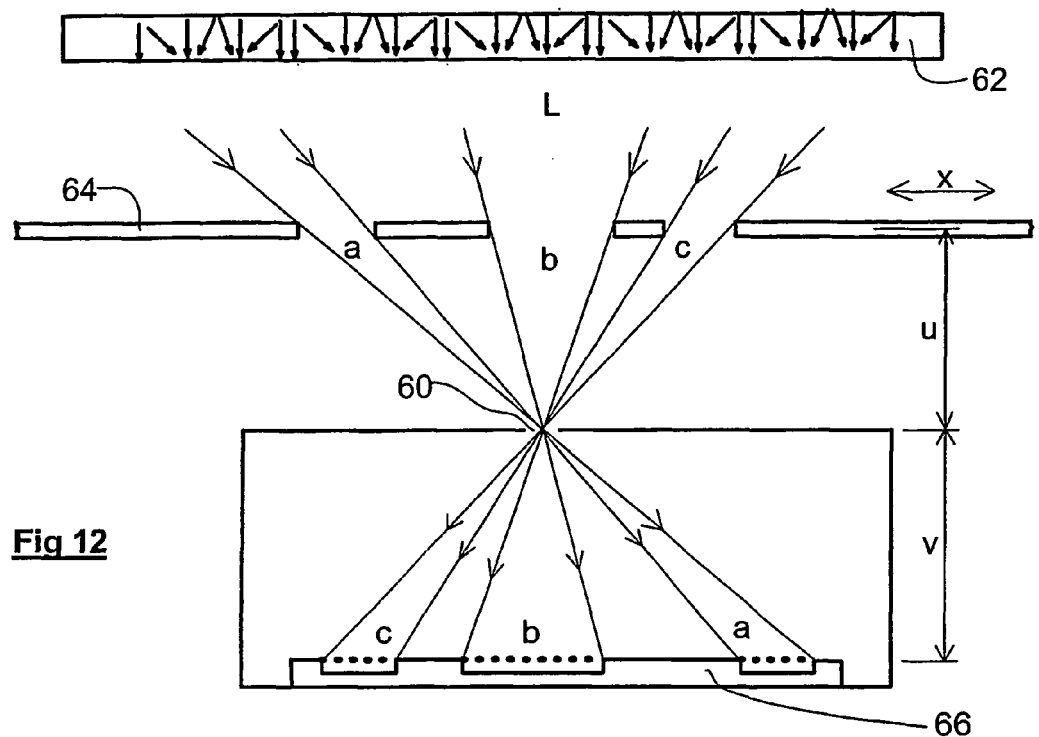
FIGS. 12 and 13 show two embodiments utilising pinhole correlation.

FIG. 12 shows an embodiment utilising a pinhole 60. In this embodiment diffuse light L from an LED 62 (light 2 could be ambient light and/or focused light). Mask 64 in the form of a measurement scale has a first pattern of apertures which allows only light bands a,b and c through it. Pinhole 60 in turn allows therethrough only light which converges at the hole. Subsequently the light bands a,b and c diverge and fall onto an electrograting 66 having a second pattern which is an inversion of the first pattern. A signal peak is attained from the detector when the first pattern correlates with the second.

The scaling relationship between the first and second patterns is given by the equation u÷v where u is the distance between the first pattern and the pinhole and v is the distance between the pinhole and the second pattern.

Figure 13:
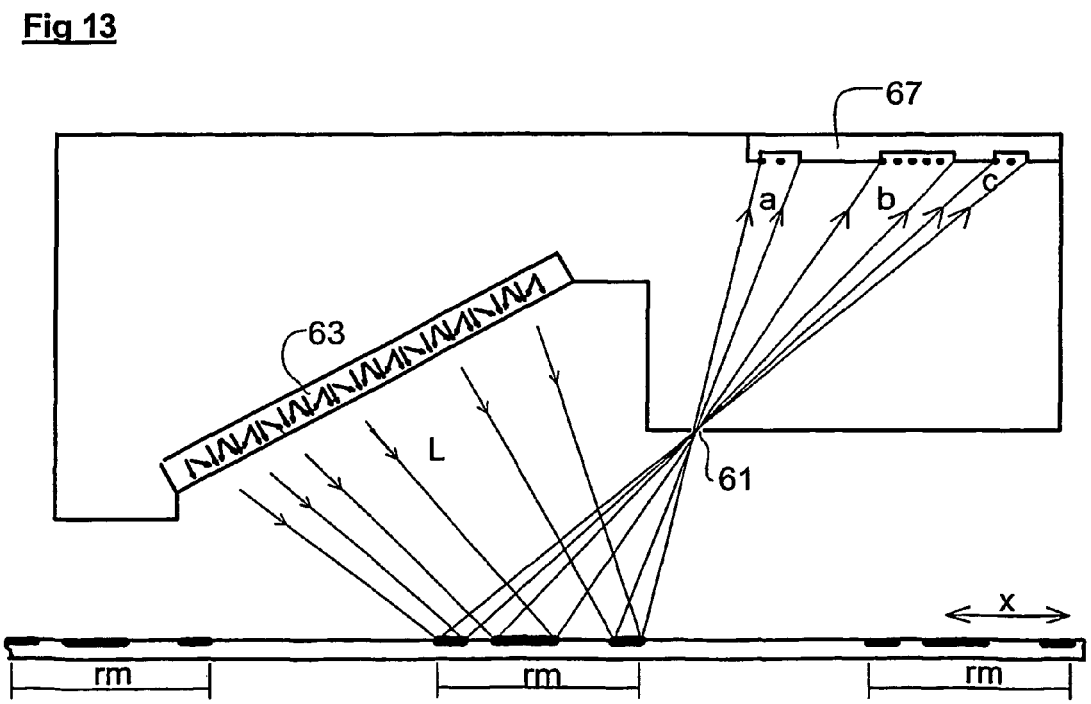

FIG. 13 shows another embodiment utilising a pinhole 61. Light L propagates towards a measurement scale 65 having a reference mark rm thereon (a first pattern). Bands of light a,b and c only are reflected towards pinhole 61 by the pattern and converge at the pinhole. The converged bands a,b and c only pass through the pinhole and diverge onto the corresponding pattern at electrograting 67 (the second pattern). A signal peak from the electrograting is obtained at correlation. In FIGS. 10–13 patterns on elements 56, 57, 64 and 65 may be incorporated into an incremental scale in the manner described above and illustrated in FIG. 5. Likewise, the apertures forming a pattern of elements 56 and 64 may be light transmissive areas in a non-transmissive medium. The embodiments of FIGS. 10–13 will work equally well where a normally light system is used i.e. a signal is produced where there is a sudden dip in the amount of light reaching the respective light detector as described in FIG. 3.

The detectors of FIGS. 10–13 are shown as an array of photodetectors arranged at the correct spacing to form a pattern. However, a detector having an oversize array which is connected only at the areas forming the pattern may be employed.

Other variants and modifications will be apparent to the skilled addressee, e.g. the embodiments of FIGS. 10–13 could be used as a rotary encoder. Variants and modifications considered for FIGS. 1–9 apply to the embodiments for FIGS. 10–13 also.

The invention claimed is:

1. A position determination device comprising:
   a light detector,
   a light source, and
   first and second relatively movable elements that together produce a change in light intensity at the light detector, wherein:
   the first element has a first pattern and the second element has a second pattern,
   one of said first and second elements is a measurement scale, the other of said first and second elements is relatively movable along the measurement scale,
   the corresponding first or second pattern on the measurement scale defines a positional reference point along the measurement scale,
   the first and second patterns and light from the light source interact when the first and second patterns coincide at said positional reference point to produce a signal that discriminates said positional reference point from other points along the measurement scale, and
   the first and second patterns have a correlating relationship, one of the first and second patterns is a reduced scale version of the other of the first and second patterns, and the light from the light source is uncollimated.

2. The position determination device as claimed in claim 1, wherein the first element is a mask and the second element is the measurement scale.

3. The position determination device as claimed in claim 1, wherein:
   the first element is the measurement scale, and
   the second element includes zones of grating structure.

4. The position determination device as claimed in claim 2, wherein the mask has at least one light transmissive area and at least one opaque area which together form the first pattern.

5. The position determination device as claimed in claim 2, wherein the measurement scale is made from reflective elements on a non-reflective substrate.

6. The position determination device as claimed in claim 2, wherein the second pattern is embedded within periodic markings of the measurement scale.

7. The position determination device as claimed in claim 6, wherein the reference mark is formed by adding or removing at least one of the periodic markings of the measurement scale.

8. The pattern determination device as claimed in claim 6, wherein the mask is a scaled version of the reference mark.

9. The position determination device as claimed in claim 3, wherein the second pattern is formed of at least one diffraction grating zone.

10. The position determination device as claimed in claim 1, wherein the first element is the measurement scale, and the second element and the detector are combined such that the second pattern is formed on the light detector.

11. The position determination device as claimed in claim 1, wherein at least one of the first and second patterns is formed from at least one of missing and additional bits of a periodic series of bits.

12. The position determination device as claimed in claim 1, wherein a distance u between the first pattern and the second pattern and a distance v between the first pattern and the light source are both substantially maintained.

13. A position determination device comprising:
   a light detector,
   a light source, and
   first and second relatively movable elements that together produce a change in light intensity at the light detector, wherein:
   the first element has a first pattern and the second element has a second pattern,
   one of said first and second elements is a measurement scale, the other of said first and second elements is relatively movable along the measurement scale,
   the corresponding first or second pattern on the measurement scale defines a positional reference point along the measurement scale,
   the first and second patterns and light from the light source interact when the first and second patterns coincide at said positional reference point to produce a signal that discriminates said positional reference point from other points along the measurement scale,
   the first and second patterns have a correlating relationship,
   one of the first and second patterns is an inverted version of the other of the first and second patterns, and
   the light from the light source is uncollimated.

14. The position determination device as claimed in claim 13, wherein the first element is the measurement scale, and the second element and the light detector are combined such that the second pattern is formed on the light detector.

15. A position determination device comprising a light detector, a light source, and first and second relatively movable elements which together produce a change in light intensity at the light detector, the first element having a first pattern and the second element having a second pattern for interacting with the first pattern and light from the light source, and one of the first pattern or the second pattern representing at least one reference position in the form of a pseudo random code, wherein the first and second patterns have a correlating relationship, the first pattern is not congruent with the second pattern and the light from the light source is uncollimated, wherein one of the first and second patterns is an inverted version of the other of the first and second patterns, and wherein a pattern of the light propagating from the light source through a pinhole and onto the light detector has a first light pattern and a second light pattern, wherein the first and second light patterns are mirror images of each other across a plane substantially perpendicular to a plane within which a circumference of the pinhole is situated.

* * * * *